(12) United States Patent
Takeuchi

(10) Patent No.: US 6,729,149 B2
(45) Date of Patent: May 4, 2004

(54) EJECTOR CYCLE SYSTEM

(75) Inventor: Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 10/264,977

(22) Filed: Oct. 4, 2002

(65) Prior Publication Data

US 2003/0066301 A1 Apr. 10, 2003

(30) Foreign Application Priority Data

Oct. 4, 2001 (JP) ........................................ 2001-308901
Aug. 22, 2002 (JP) ........................................ 2002-241850

(51) Int. Cl.[7] .............................. F25B 1/06; F25B 1/00
(52) U.S. Cl. ........................................... 62/191; 62/500
(58) Field of Search .............................. 62/90, 116, 175, 62/191, 278, 500, 512

(56) References Cited

U.S. PATENT DOCUMENTS

| | | | |
|---|---|---|---|
| 5,343,711 A | | 9/1994 | Kornhauser et al. |
| 6,477,857 B2 | * | 11/2002 | Takeuchi et al. ............... 62/500 |
| 6,550,265 B2 | * | 4/2003 | Takeuchi et al. ........... 62/324.2 |
| 6,584,794 B2 | * | 7/2003 | Takeuchi et al. ............... 62/278 |

FOREIGN PATENT DOCUMENTS

| | | |
|---|---|---|
| DE | 36 22 743 | 1/1988 |
| EP | 1 134 517 | 9/2001 |
| JP | 53-12421 | 11/1993 |
| JP | 5-312421 | 11/1993 |
| JP | 6-11197 | 1/1994 |
| JP | 60-11197 | 1/1994 |
| JP | 6-58640 | 3/1994 |
| JP | 2000-283577 | 10/2000 |

OTHER PUBLICATIONS

European Search Report dated Aug. 26, 2003 in corresponding European Application No. 02 02 2243.

* cited by examiner

*Primary Examiner*—Melvin Jones
(74) *Attorney, Agent, or Firm*—Harness, Dickey & Pierce PLC

(57) ABSTRACT

In an ejector cycle system, a variable throttle is disposed at an upstream side of an ejector. When high-pressure side refrigerant pressure in the ejector cycle system is approximately equal to or higher than critical pressure of the refrigerant, the variable throttle is fully opened. When the high-pressure side refrigerant pressure is approximately lower than the critical pressure of the refrigerant, a throttle open degree of the variable throttle is reduced from the fully open degree so that high-pressure side refrigerant is decompressed in two steps of the variable throttle and the ejector. Accordingly, in both cases of a high heat load and a low heat load of the ejector cycle system, COP of the ejector cycle system can be improved.

9 Claims, 4 Drawing Sheets

⇒ INSUFFICIENT THROTTLE

EJECTOR CYCLE SYSTEM

CROSS-REFERENCE TO RELATED APPLICATION

This application is related to Japanese Patent Applications No. 2001-308901 filed on Oct. 4, 2001, and No. 2002-241850 filed on Aug. 22, 2002, the contents of which are hereby incorporated by reference.

BACKGROUND OF THE INVENTION

1. Field of the Invention

The present invention relates to an ejector cycle system with two-step refrigerant decompression.

2. Description of Related Art

In an ejector cycle system described in JP-A-6-11197, an ejector sucks gas refrigerant evaporated in an evaporator at a low pressure side, and increases a pressure of refrigerant to be sucked into a compressor by converting an expansion energy to a pressure energy. In the ejector cycle system, a nozzle is constructed by a fixed throttle. Therefore, when heat load of the ejector cycle system changes, a flow amount of refrigerant flowing into the ejector is changed, and a decompression degree (throttle degree) in the nozzle is changed. Specifically, in a cooling device, when the outside air temperature is low and the heat load becomes smaller, the refrigerant amount evaporated in the evaporator is reduced, and a refrigerant circulating amount is reduced. In this case, a decompression degree of the refrigerant in the nozzle is excessively reduced, because a pressure loss generated in a fixed throttle is approximately proportion to the square of a flow rate. Accordingly, when the nozzle is selected to have a suitable decompression degree in the high heat load, a necessary throttle degree may be not obtained even when a discharge capacity of the compressor is made minimum, and the flow amount of refrigerant flowing into a radiator becomes larger more than a necessary amount. As a result, the flow rate in the radiator is excessively increased. As shown by the solid line (the actual state) in FIG. 6, refrigerant from the radiator is decompressed by the nozzle of the ejector without being sufficiently cooled in the radiator. Therefore, a cycle balance in the ejector cycle system is deteriorated, coefficient of performance (COP) of the ejector cycle system is deteriorated.

On the other hand, when the nozzle diameter is set smaller for obtaining a suitable decompression degree (throttle degree) in the low heat load, the load of the compressor is excessively increased when the refrigerant flow amount increases in the high heat load. Therefore, in this case, the COP of the ejector cycle system is decreased.

When carbon dioxide is used in the ejector cycle system, the high-pressure side refrigerant pressure becomes higher than the critical pressure of carbon dioxide in the high heat load, and the high-pressure side refrigerant pressure becomes lower than the critical pressure in the low heat load. FIG. 7 is a simulation graph showing a relationship between the outside air temperature and a suitable nozzle diameter where the COP becomes maximum when the ejector cycle system is used for an air conditioner. In FIG. 7, a diameter of a mixing portion of the ejector is 2.7 mm. As shown in FIG. 7, the suitable nozzle diameter in a super critical area is greatly different from the suitable nozzle diameter in a two-phase area (non-super critical area).

SUMMARY OF THE INVENTION

In view of the foregoing problems, it is an object of the present invention to provide an ejector cycle system having an ejector and a variable throttle unit which changes a decompression degree in accordance with high-pressure side refrigerant pressure.

It is another object of the present invention to provide an ejector cycle system which is operated while maintaining high COP.

According to the present invention, an ejector cycle system includes a compressor for sucking and compressing refrigerant, a radiator which cools refrigerant discharged from the compressor, an evaporator for evaporating the refrigerant, a gas-liquid separator for separating refrigerant from an ejector into gas refrigerant and liquid refrigerant. The ejector includes a nozzle for converting a pressure energy of high-pressure refrigerant from the radiator to a speed energy so that the high-pressure refrigerant is decompressed and expanded and gas refrigerant evaporated in the evaporator is sucked, and a pressure-increasing portion in which the speed energy is converted to the pressure energy so that the pressure of refrigerant is increased while refrigerant discharged from the nozzle and gas refrigerant from the evaporator are mixed. In the ejector cycle system, a decompression unit is disposed at an upstream side of the nozzle in a refrigerant flow direction for decompressing the refrigerant flowing from the radiator. Further, when pressure of the refrigerant before flowing into the decompression unit is equal to or higher than a predetermined pressure, a throttle open degree of the decompression unit becomes larger than that when the pressure of the refrigerant before flowing into the decompression unit is lower than the predetermined pressure. Accordingly, even when a nozzle radial dimension is suitably set in a pressure area higher than the predetermined pressure, it can prevent the throttle open degree is excessively decreased in a pressure area lower than the predetermined pressure, where heat load is small. Thus, in both cases of high-heat load and low-heat load, COP of the ejector cycle system can be effectively improved.

For example, when the pressure of refrigerant discharged from the compressor is increased to the critical pressure of the refrigerant, the predetermined pressure is set at the critical pressure of the refrigerant. Accordingly, in the supercritical area and in the two-phase area, the COP of the ejector cycle system can be effectively improved.

Preferably, a variable throttle unit is disposed between the evaporator and the gas-liquid separator, at a refrigerant inlet side, for controlling at least a flow amount of refrigerant flowing into the evaporator. Accordingly, even when the throttle open degree of the decompression unit is made larger, the capacity of the ejector cycle system can be accurately controlled by controlling the open degree of the variable throttle unit provided at a low-pressure side.

Preferably, the variable throttle unit is an expansion valve. In this case, a valve open degree of the variable throttle unit is controlled so that a refrigerant heating degree at an outlet side of the evaporator becomes a predetermined degree. Alternatively, the variable throttle unit is a pressure difference valve. In this case, a valve open degree of the pressure difference valve is controlled such that a pressure different between a refrigerant inlet side and a refrigerant outlet side of the pressure difference valve becomes a predetermined difference.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
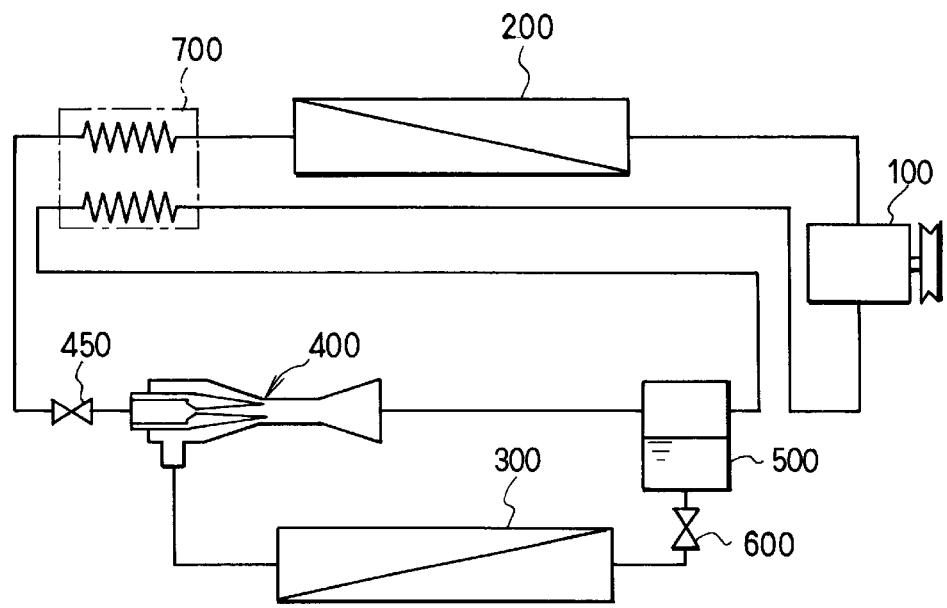
FIG. 1 is a schematic diagram showing an ejector cycle system according to a preferred embodiment of the present invention.

A preferred embodiment of the present invention will be described hereinafter with reference to the accompanying drawings.

In this embodiment, the present invention is typically applied to an ejector cycle system for a vehicle air conditioner, in which carbon dioxide ($CO_2$) is used as refrigerant.

In the embodiment, a compressor 100 is driven by a driving source such as a vehicle engine (not shown) to suck and compress refrigerant (e.g., carbon dioxide in the first embodiment). In a radiator 200 (i.e., high-pressure side heat exchanger), refrigerant discharged from the compressor 100 is heat-exchanged with air (outside air) outside a passenger compartment. The compressor 100 is a variable displacement compressor where a discharge capacity (discharge flow amount) is controlled so that temperature of refrigerant to be sucked to the compressor 100 becomes to a predetermined temperature.

In an evaporator 300 (i.e., low-pressure side heat exchanger), liquid refrigerant in the ejector cycle system is heat-exchanged with air to be blown into a passenger compartment to cool air. An ejector 400 decompresses and expands high-pressure refrigerant flowing from the radiator 200 to suck therein gas refrigerant evaporated in the evaporator 300, and converts an expansion energy to a pressure energy to increase the pressure of refrigerant to be sucked into the compressor 100. An electrical variable throttle 450 for decompressing refrigerant is disposed at an upstream side of the ejector 400 in the refrigerant flow direction. In the variable throttle 450, a throttle open degree can be controlled to be changed.

Figure 2:
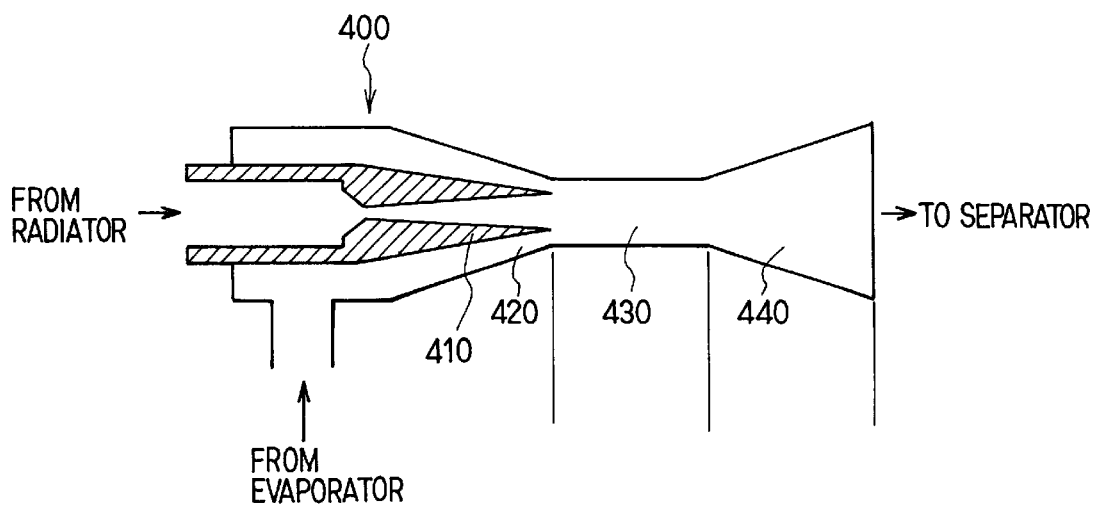
FIG. 2 is an enlarged schematic diagram showing an ejector used in the ejector cycle system according to the embodiment.

As shown in FIG. 2, the ejector 400 includes a nozzle 410, a refrigerant flow portion 420, a mixing portion 430 and a diffuser 440. The nozzle 410 decompresses and expands the high-pressure refrigerant flowing from the radiator 200 by converting a pressure energy (pressure head) of the refrigerant to a speed energy (speed head) thereof. Gas refrigerant evaporated in the evaporator 300 flows into the refrigerant flow portion 420 of the ejector 400. The gas refrigerant flowing from the evaporator 300 into the refrigerant flow portion 420 is sucked to the air mixing portion 430 by high-speed refrigerant jetted from the nozzle 410 to be mixed with the refrigerant jetted from the nozzle 410 in the mixing portion 430. Further, in the diffuser 440, the speed energy of refrigerant is converted to the pressure energy so that the pressure of refrigerant to be sucked into the compressor 100 is increased. The refrigerant flow portion 420 is formed around the nozzle 410 into a conical taper shape where a passage sectional area is reduced as the position close to the mixing portion 430.

Here, the refrigerant pressure in the ejector 400 is increased not only in the diffuser 440, but also in the mixing portion 430. Therefore, in the ejector 400, a pressure-increasing portion is constructed by the mixing portion 430 and the diffuser 440. In the first embodiment, a cross-sectional area of the mixing portion 430 is made constant until the diffuser 440. However, the mixing portion 430 may be tapered so that the cross-sectional area becomes larger toward the diffuser 440.

As shown in FIG. 1, the refrigerant from the ejector 400 flows into a gas-liquid separator 500, to be separated into gas refrigerant and liquid refrigerant in the gas-liquid separator 500. The gas refrigerant separated in the gas-liquid separator 500 is sucked into the compressor 100, and the separated liquid refrigerant is sucked toward the evaporator 300.

The gas-liquid separator 500 is connected to the evaporator 300 through a refrigerant passage. In the refrigerant passage, a flow amount control valve 600 such as a capillary tube, a fixed throttle and a variable throttle can be provided. When refrigerant flows through the flow amount control valve 600, a predetermined pressure loss generates, and the refrigerant to be sucked into the evaporator 300 is sufficiently decompressed. Further, the flow amount control valve 600 controls the flow amount of refrigerant flowing into the evaporator 300.

Further, an interior heat exchanger 700 is disposed to perform heat exchange between refrigerant flowing from the radiator 200 and gas refrigerant flowing from the gas-liquid separator 500 toward the compressor 100.

Next, operation of the ejector cycle system will be now described. When the compressor 100 stats operation, the gas refrigerant from the gas-liquid separator 500 is sucked into the compressor 100, and the compressed refrigerant is discharged from the compressor 100 into the radiator 200. When the high-pressure side refrigerant pressure before being decompressed is approximately equal to or higher than the critical pressure of carbon dioxide, the variable throttle 450 is fully opened. Accordingly, refrigerant cooled in the radiator 200 is decompressed in the nozzle 410 of the ejector 400, and gas refrigerant in the evaporator 300 is sucked into the ejector 400. On the other hand, when the high-pressure side refrigerant pressure is approximately lower than the critical pressure, the throttle open degree of the variable throttle 450 is reduced from the fully open degree by a predetermined degree, so that refrigerant is decompressed by two steps of the variable throttle 450 and the nozzle 410 of the ejector 400. Therefore, in this case, refrigerant from the radiator 200 is decompressed in the two steps of the variable throttle 450 and the nozzle 410 of the ejector 400.

The refrigerant sucked from the evaporator 300 and the refrigerant jetted from the nozzle 410 are mixed in the mixing portion 430, and the dynamic pressure of refrigerant is converted to the hydrostatic pressure thereof. Thereafter, the refrigerant from the ejector 400 flows into the gas-liquid separator 500.

On the other hand, because gas refrigerant is sucked from the evaporator 300 into the ejector 400, liquid refrigerant from the gas-liquid separator 500 flows into the evaporator 300 to be evaporated by absorbing heat from air to be blown into the passenger compartment.

Figure 3:
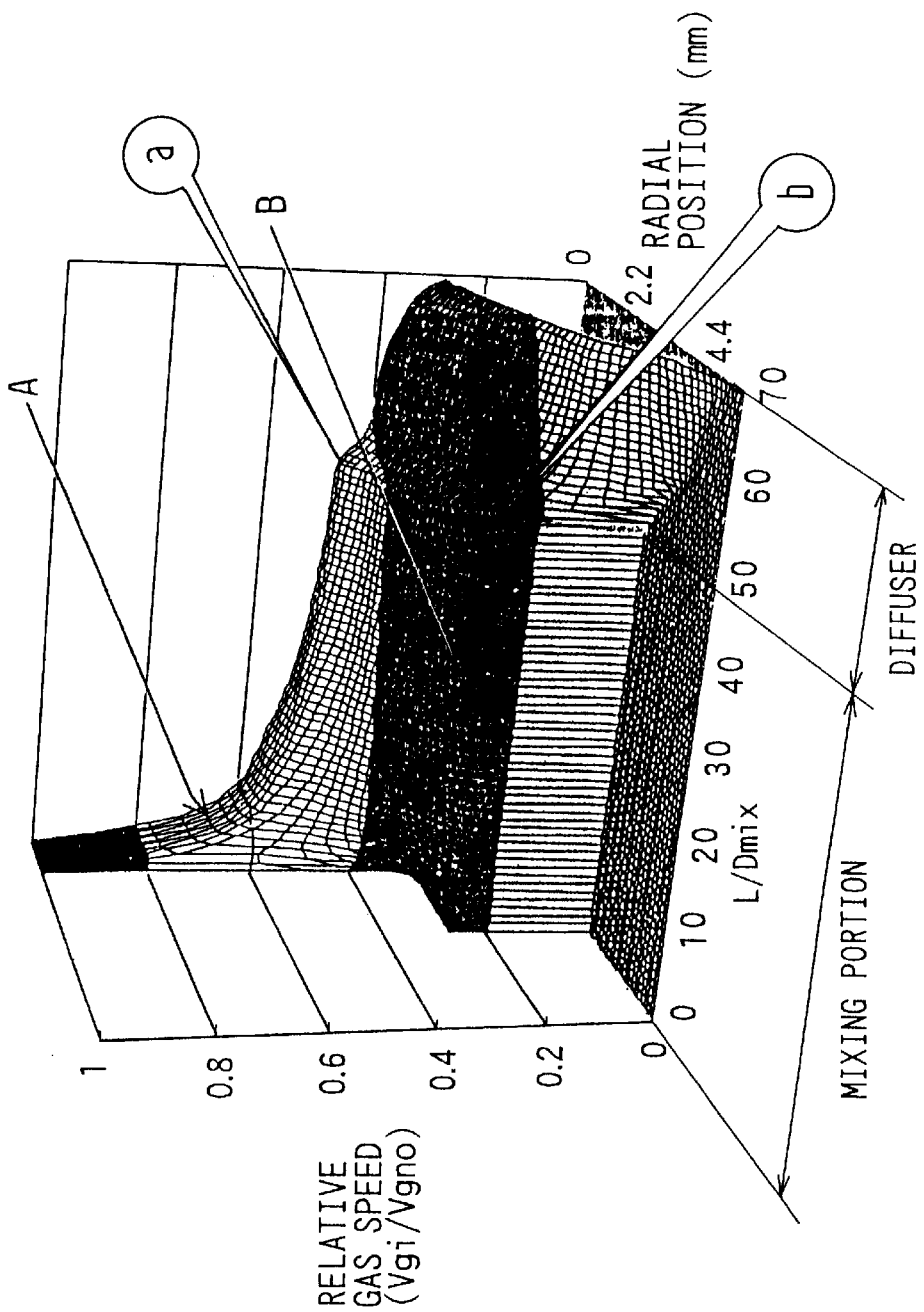
FIG. 3 is a three-dimensional characteristic view showing a relationship between a refrigerant relative flow speed from a refrigerant outlet of a nozzle to a refrigerant outlet of a diffuser of an ejector, and a radial position in a radial direction from a center in a refrigerant passage section of the ejector, according to the embodiment.

FIG. 3 is a simulation result showing a relationship between a refrigerant flow speed (relative speed Vgi/Vgno) from the refrigerant outlet of the nozzle 410 to the refrigerant outlet of the diffuser 440, and a radial position in a radial direction from a center in a refrigerant passage cross-section of the ejector 400. The simulation of FIG. 3 is performed, assuming that the refrigerant flow speed distribution (gas flow speed distribution) is symmetrical relative to a center axial line, and assuming that the refrigerant flow speed at the outlet of the nozzle 410 is 1. In FIG. 3, A indicates a jet-flow gas refrigerant flowing from the nozzle 410, and B indicates a suction gas refrigerant (suction flow gas) sucked from the evaporator 300. As shown in FIG. 3, the flow speed of the jet-flow gas refrigerant discharged from the nozzle 410 becomes lower while the jet-flow gas refrigerant sucks and accelerates refrigerant from the evaporator 300. Therefore, at a refrigerant outlet side of the mixing portion 430 (refrigerant inlet side of the diffuser 440), the flow speed decrease of the jet-flow gas refrigerant is nearly finished as shown by "a" in FIG. 3, and the sucked gas refrigerant from the evaporator 300 is sufficiently accelerated as shown by "b" in FIG. 3. That is, at the refrigerant outlet side of the mixing portion 430 (refrigerant inlet side of the diffuser 440), gas refrigerant discharged from the nozzle 410 and gas refrigerant sucked from the evaporator 300 are mixed so that the flow speed of the gas refrigerant sucked from the evaporator 300 becomes approximately equal to that of the gas refrigerant from the nozzle 410. The mixed refrigerant mixed in the mixing portion 430 flows into the diffuser 440, and the refrigerant pressure is increased in the diffuser 440 while the flow speed of the refrigerant is decreased.

In an ideal ejector 400, the refrigerant pressure is increased in the mixing portion 430 so that the sum of the kinetic amount of the driving flow refrigerant (jet flow refrigerant) from the nozzle 410 and the kinetic amount of the suction flow refrigerant from the evaporator 300 are maintained, and the refrigerant pressure is increased in the diffuser 440 so that the energy thereof is maintained.

According to the present invention, when the high-pressure side refrigerant pressure discharged from the compressor 100 is approximately equal to or higher than the critical pressure, the variable throttle 450 is fully opened so that refrigerant is decompressed in the nozzle 410 without being decompressed in the variable throttle 450. On the other hand, when the high-pressure side refrigerant pressure is lower than critical pressure, the throttle open degree of the variable throttle 450 is reduced from the fully open degree, so that the refrigerant is decompressed in two steps of the variable throttle 450 and the nozzle 410. Accordingly, even when the nozzle diameter is suitably set in the super-critical area, it can prevent the decompression degree (throttle open degree) from being excessively decreased in the non-critical area (two-phase area) where the heat load is small. Accordingly, in the non-critical area, it can prevent radiating amount in the radiator 200 from being insufficient. Thus, in both of the critical area and non-critical area, the COP of the ejector cycle system can be improved by a simple method.

Figure 4:
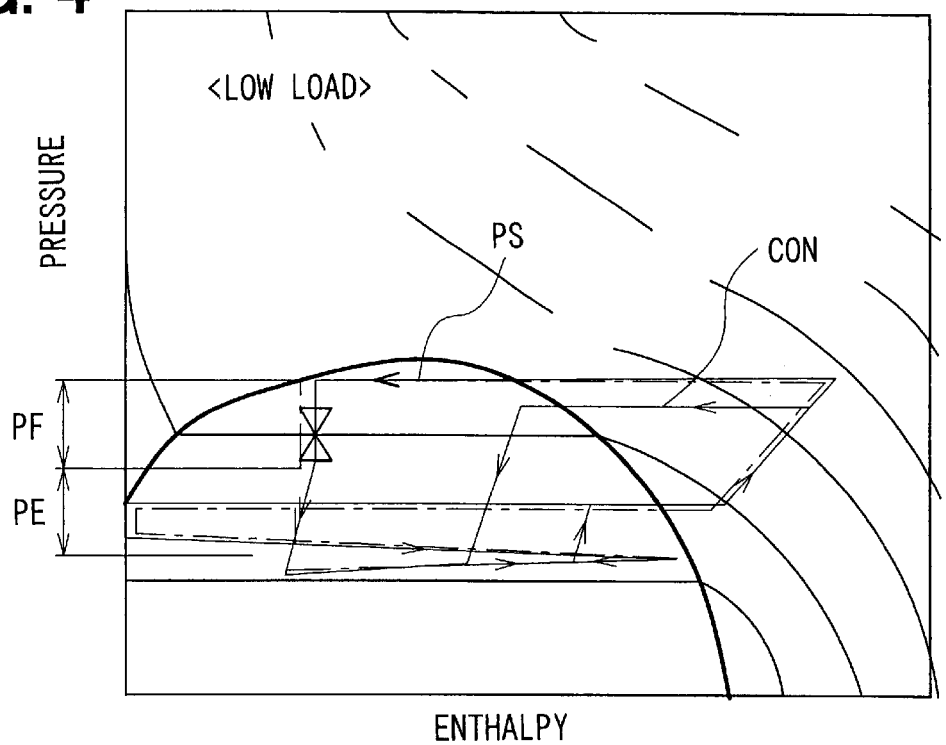
FIG. 4 is a Mollier diagram (p-h diagram) showing an operation of the ejector cycle system according to the embodiment.

The radial dimension of the nozzle 410 is set to have a suitable throttle in a high-load operation. Therefore, when refrigerant is discharged from the compressor with the maximum capacity in the high-load operation, the refrigerant flow is throttled in the nozzle 410 so that the high-pressure side refrigerant pressure discharged from the compressor 100 is increased to a pressure at which the high-pressure side refrigerant is sufficiently heat-exchanged with outside air in the radiator 200. Accordingly, in the high-load operation with the super-critical area, refrigerant flowing through the radiator 200 is sufficiently heat-exchanged with outside air to be sufficiently cooled by outside air. However, because the nozzle 410 of the ejector 400 in the present embodiment is a fixed nozzle, it is impossible to suitably maintain the cycle efficiency of the ejector cycle system at a suitable value in the low load where the outside air temperature is low. In the low-load operation, the discharge capacity of the compressor 100 can be decreased, and the flow amount of refrigerant circulating in the cycle can be decreased. However, in this case, a suitable throttle of the refrigerant flow cannot be performed by the nozzle 410 (fixed throttle). In FIG. 4, CON shows the operation of an ejector cycle system with one-step throttle in the nozzle, and PS shows the operation of the ejector cycle system with two-step throttle in the nozzle 410 and the variable throttle 450. Further, in the two-step throttle, PF is a reduced pressure in the first-step decompression, and PE is a reduced pressure in the ejector 400.

As shown in FIG. 4, in the case CON of the one-step throttle in the nozzle, the flow amount of refrigerant flowing into the radiator 200 is relatively larger as compared with the radiating capacity of the radiator 200 in the low load, and the refrigerant cannot be sufficiently cooled in the radiator 200.

In this embodiment, the variable throttle 450 is disposed at the upstream side of the fixed nozzle 410. Therefore, by controlling the throttle open degree of the variable throttle 450 in the low load, the refrigerant amount circulating in the ejector cycle system can be controlled to be restricted. That is, even in a low outside air temperature with the low load operation, the refrigerant flow amount in the ejector cycle system is controlled by the throttle of the nozzle 410 and the throttle of the variable throttle 450, so that the refrigerant flow amount can be reduced to an amount capable of sufficiently performing heat exchange with outside air in the radiator 200. Accordingly, the COP can be improved in the ejector cycle system even in the low load operation.

Figure 5:
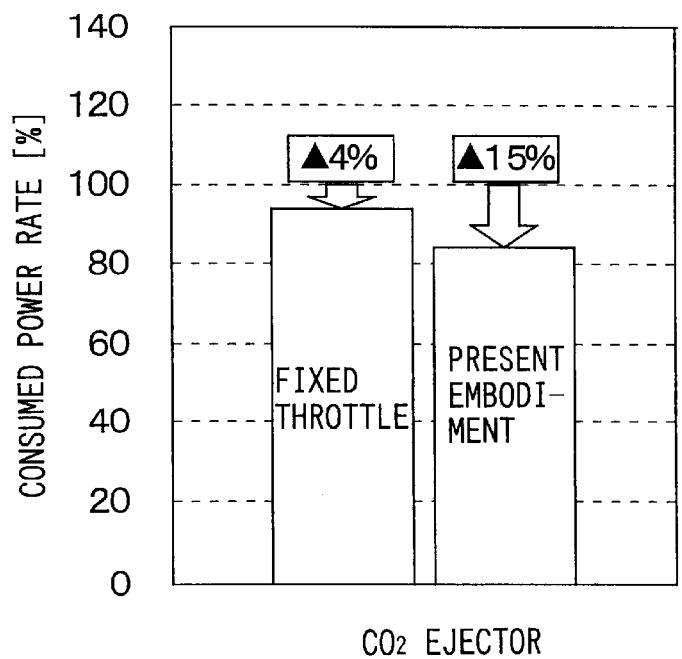
FIG. 5 is a graph showing a consumed power rate in the embodiment of the present invention, and a consumed power rate in a case where refrigerant is decompressed only in an ejector nozzle (fixed throttle)
Figure 6:
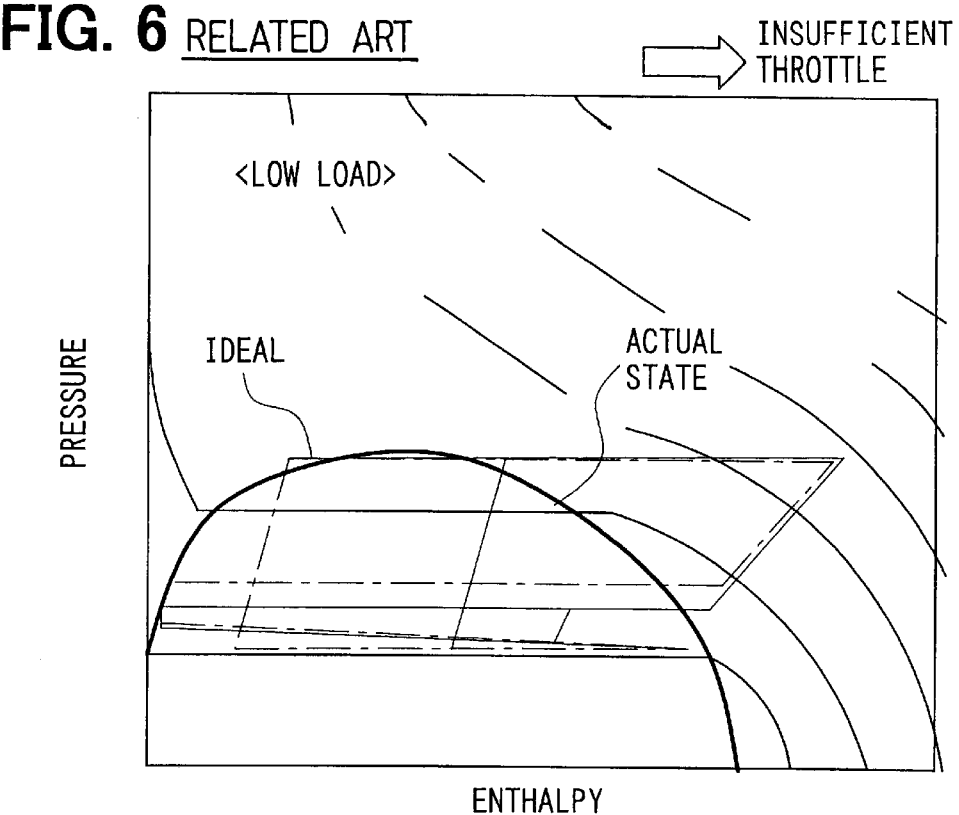
FIG. 6 is a Mollier diagram (p-h diagram) of an ejector cycle system in a related art.
Figure 7:
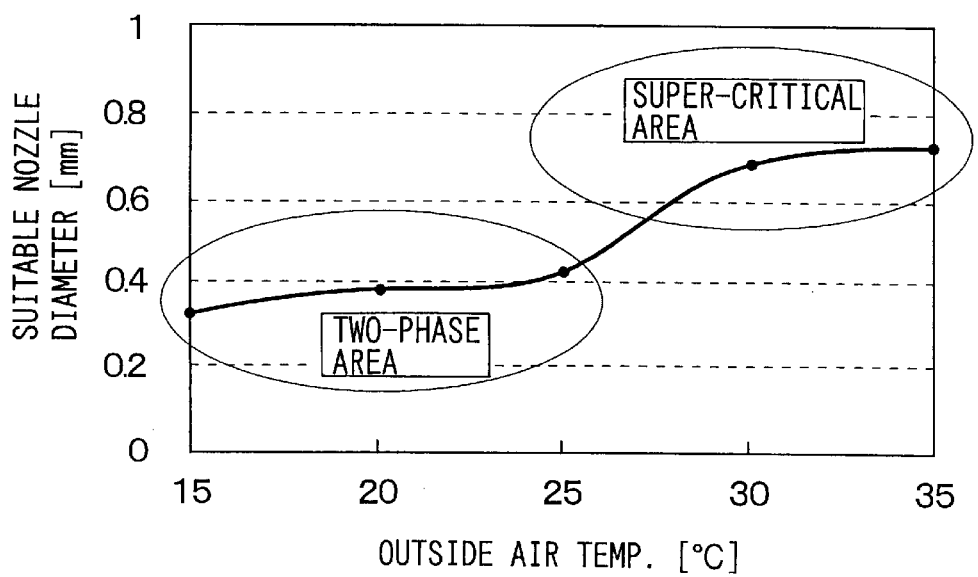
FIG. 7 is a graph showing a relationship between a suitable nozzle diameter and an outside air temperature (heat load), for explaining a problem to be solved by the present invention.

As shown in FIG. 5, in the present embodiment, the consumed power is reduced as compared with the case of the fixed throttle where the refrigerant is decompressed by the one step of the nozzle 410.

In the above-described embodiment, an electrical variable throttle is used as the variable throttle 450. However, the variable throttle 450 can be constructed by a valve device having a valve and a bleed hole where refrigerant always flows while bypassing the valve. In this case, the valve is electrically or mechanically operated to close a refrigerant passage when the high-pressure side refrigerant pressure is lower than the critical pressure, and to open the refrigerant passage when the high-pressure side refrigerant pressure is equal to or higher than the critical pressure.

Further, according to the embodiment, the flow amount control valve 600 is disposed at the inlet side of the evaporator 300. That is, the flow amount control valve 600 is disposed at a low pressure side. Therefore, even when the variable throttle 450 is fully opened when the high-pressure side refrigerant pressure is equal to or higher than the critical pressure, the refrigerant flow amount can be accurately controlled by the flow amount control valve 600.

In the above-described embodiment, the flow amount control valve 600 can be constructed by a fixed throttle or a variable throttle. When the flow amount control valve 600 is constructed by the variable throttle such as an expansion valve and a pressure difference valve, the throttle open degree can be changed. When the flow amount control valve 600 is constructed by the expansion valve, the opening degree of the flow amount control valve 600 is controlled so that a refrigerant heating degree at an outlet of the evaporator 300 becomes a predetermined value. On the other hand, when the flow amount control valve 600 is the pressure difference valve, the opening degree of the pressure difference valve 600 is controlled so that a pressure difference between an inlet and an outlet of the pressure difference valve 600 becomes a predetermined pressure difference.

In the above-described embodiment, the opening degree of the variable throttle 450 can be continuously controlled to become larger as the high-pressure side refrigerant pressure increases and to become smaller as the high-pressure side refrigerant pressure decreases.

In the above-described embodiment, an electrical compressor can be used instead of the variable displacement compressor 100.

Although the present invention has been fully described in connection with the preferred embodiment thereof with reference to the accompanying drawings, it is to be noted that various changes and modifications will become apparent to those skilled in the art.

For example, in the ejector cycle system according to the above-described embodiment, carbon dioxide is used as refrigerant. However, the present invention can be applied to an ejector cycle system where refrigerant such as hydrocarbon and fluorocarbon (flon) is used.

In the above-described embodiments of the present invention, the ejector cycle system is used for a vehicle air conditioner. However, the ejector cycle system can be used for an air conditioner for an any compartment, a cooling unit, or a heating unit using a heat pump.

In the above-described embodiment of the present invention, the internal heat exchanger 700 is provided in the ejector cycle system. However, the internal heat exchanger can be omitted in the ejector cycle system.

In the above-described embodiment, the variable throttle 450 can be electrically operated or can be mechanically operated.

In the above-described embodiment, the opening degree of the variable throttle 450 can be opened and closed based on a predetermined pressure without being limited to the critical pressure of refrigerant. That is, the variable throttle 450 can be fully opened when the high-pressure side refrigerant pressure is higher than the predetermined pressure, and the opening degree of the variable throttle 450 can be reduced from the fully open degree when the high-pressure refrigerant pressure is lower than the predetermined pressure. Even in this case, the opening degree of the variable throttle 450 can be continuously controlled to become larger as the high-pressure side refrigerant pressure increases, and to become smaller as the high-pressure side refrigerant pressure decreases.

Further, the present invention can be applied to an ejector cycle system where the high-pressure side refrigerant pressure is lower than the critical pressure of refrigerant.

Such changes and modifications are to be understood as being within the scope of the present invention as defined by the appended claims.

What is claimed is:

1. An ejector cycle system comprising:
   a compressor for sucking and compressing refrigerant;
   a radiator which cools the refrigerant discharged from the compressor;
   an evaporator for evaporating refrigerant;
   an ejector including a nozzle for converting a pressure energy of high-pressure refrigerant from the radiator to a speed energy so that the high-pressure refrigerant is decompressed and expanded and gas refrigerant evaporated in the evaporator is sucked, and a pressure-increasing portion in which the speed energy is converted to the pressure energy so that the pressure of refrigerant is increased while refrigerant discharged from the nozzle and the gas refrigerant from the evaporator are mixed;
   a decompression unit disposed at an upstream side of the nozzle in a refrigerant flow direction, for decompressing the refrigerant from the radiator; and
   a gas-liquid separator for separating the refrigerant flowing from the ejector into gas refrigerant and liquid refrigerant, wherein:
   when pressure of the refrigerant before flowing into the decompression unit is equal to or higher than a predetermined pressure, a throttle open degree of the decompression unit becomes larger than that when the pressure of the refrigerant before flowing into the decompression unit is lower than the predetermined pressure.

2. The ejector cycle system according to claim 1, wherein the predetermined pressure is critical pressure of the refrigerant.

3. The ejector cycle system according to claim 2, wherein:
   when the pressure of the refrigerant before flowing into the decompression unit is equal to or higher than the critical pressure of the refrigerant, the decompression unit is fully opened.

4. The ejector cycle system according to claim 3, wherein:
   when the pressure of the refrigerant before flowing into the decompression unit is lower than the critical pressure of the refrigerant, the opening degree of the decompression unit is reduced as the pressure of the refrigerant before flowing into the decompression unit becomes lower.

5. The ejector cycle system according to claim 1, wherein:
   the valve open degree is set larger as the pressure of the refrigerant before flowing into the decompression unit becomes higher.

6. The ejector cycle system according to claim 1, wherein:
   the gas-liquid separator has a gas refrigerant outlet coupled to a refrigerant suction side of the compressor, and a liquid refrigerant outlet coupled to the side of the evaporator.

7. The ejector cycle system according to claim 6, further comprising
   a variable throttle unit disposed between the evaporator and the gas-liquid separator, for controlling at least a flow amount of refrigerant flowing into the evaporator.

8. The ejector cycle system according to claim 7, wherein:
   the variable throttle unit is an expansion valve in which a valve open degree is controlled so that a refrigerant heating degree at an outlet side of the evaporator becomes a predetermined degree.

9. The ejector cycle system according to claim 7, wherein:
   the variable throttle unit is a pressure difference valve in which a valve open degree is controlled such that a pressure different between a refrigerant inlet side and a refrigerant outlet side of the pressure difference valve becomes a predetermined difference.

* * * * *